United States Patent [19]

Nakamura et al.

[11] Patent Number: 4,982,809
[45] Date of Patent: Jan. 8, 1991

[54] METHOD AND APPARATUS FOR CONTROLLING 4-WHEEL DRIVE SYSTEM FOR A MOTOR VEHICLE

[75] Inventors: Yasunari Nakamura, Nagoya; Kojiro Kuramochi, Okazaki; Teruo Akashi, Nagoya, all of Japan

[73] Assignees: Toyota Jidosha Kabushiki Kaisha; Aisin AW Co., Ltd., both of Aichi, Japan

[21] Appl. No.: 247,493

[22] Filed: Sep. 22, 1988

[30] Foreign Application Priority Data

Sep. 29, 1987 [JP] Japan .................. 62-244593

[51] Int. Cl.⁵ .............................. B60K 17/34
[52] U.S. Cl. ................... 180/248; 74/866; 180/249; 364/424.1; 364/426.03
[58] Field of Search ............ 74/710.5, 866; 280/248, 280/249, 233; 364/426.03, 424.1

[56] References Cited

U.S. PATENT DOCUMENTS

| | | | |
|---|---|---|---|
| 4,486,838 | 12/1984 | Itoh et al. | 364/424.1 |
| 4,490,790 | 12/1984 | Shinoda | 364/424.1 |
| 4,653,006 | 3/1987 | Osanai et al. | 364/424.1 |
| 4,658,360 | 4/1987 | Osanai et al. | 364/424.1 |
| 4,698,764 | 10/1987 | Inagaki et al. | 364/424.1 |
| 4,699,236 | 10/1987 | Morisawa et al. | 364/424.1 X |
| 4,702,341 | 10/1987 | Taga et al. | 180/249 |
| 4,729,450 | 3/1988 | Murisawa et al. | 364/424.1 X |
| 4,730,708 | 3/1988 | Hamano et al. | 192/3.58 X |
| 4,751,856 | 6/1988 | Nakamura et al. | 180/249 X |
| 4,754,836 | 7/1988 | Harada et al. | 180/249 |
| 4,766,973 | 8/1988 | Kashihara et al. | 180/249 |
| 4,768,399 | 9/1988 | Kubo et al. | 180/249 X |
| 4,768,609 | 9/1988 | Taga et al. | 180/249 |
| 4,776,421 | 10/1988 | Kashihara | 180/249 X |
| 4,792,011 | 12/1988 | Stelter et al. | 180/249 X |
| 4,792,012 | 12/1988 | Morisawa et al. | 180/249 X |
| 4,866,624 | 9/1989 | Nishikawa et al. | 180/249 |

FOREIGN PATENT DOCUMENTS

| | | | |
|---|---|---|---|
| 226472 | 6/1987 | European Pat. Off. | 180/233 |
| 196454 | 10/1985 | Japan | 192/3.51 |
| 46714 | 2/1987 | Japan | 180/249 |
| 125920 | 6/1987 | Japan | 180/233 |
| 166113 | 7/1987 | Japan | 180/249 |
| 258819 | 11/1987 | Japan | 180/249 |

*Primary Examiner*—Mitchell J. Hill
*Attorney, Agent, or Firm*—Oliff & Berridge

[57] ABSTRACT

A method and an apparatus for controlling a 4-wheel drive system of a motor vehicle having front wheels and rear wheels and a power transmission. The 4-wheel drive system includes a differential control clutch having input and output elements which are rotatable relative to each other with a controlled amount of engagement therebetween, so as to control a ratio of distribution of a torque from the power transmission to front and rear wheels. When it is determined that the power transmission is commanded to be shifted from a first gear position to a second gear position whose speed ratio is different from that of the first gear position, the differential control clutch is temporarily placed in a fully disengaged position thereof for a predetermined time duration. With the clutch placed in the fully disengaged position upon each shifting operation of the transmission to the second gear position, the separated friction surfaces of the clutch may be lubricated to maintain high durability of the clutch.

14 Claims, 3 Drawing Sheets

FIG. 4
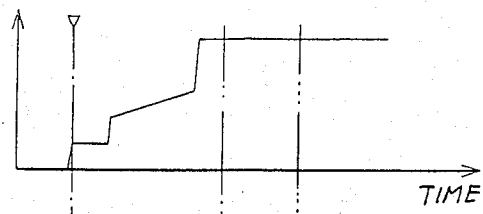
O/D CLUTCH SERVO PRESSURE OF TRANSMISSION UNIT
O/D GEAR POSITION COMMAND
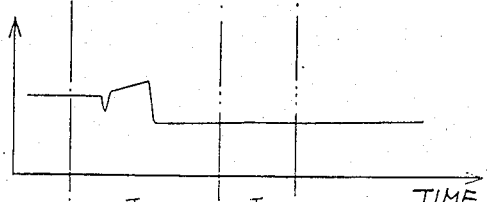
OUTPUT SHAFT TORQUE OF TRANSMISSION UNIT
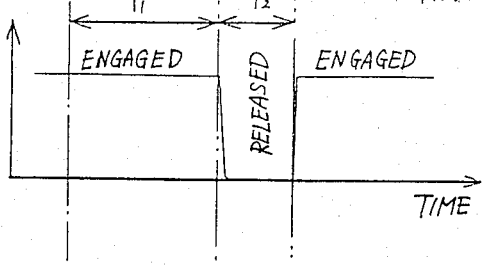
SERVO PRESSURE OF DIFFERENTIAL CONTROL CLUTCH
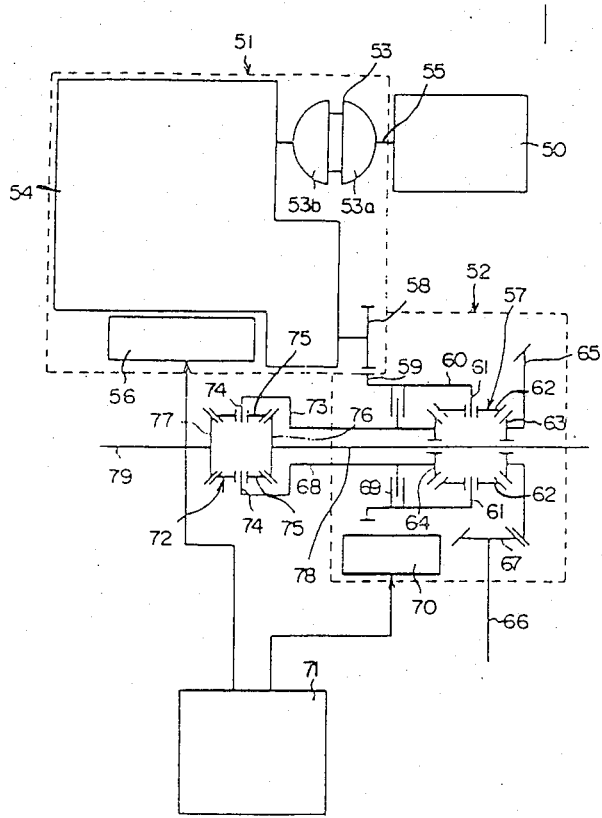
FIG. 5

METHOD AND APPARATUS FOR CONTROLLING 4-WHEEL DRIVE SYSTEM FOR A MOTOR VEHICLE

BACKGROUND OF THE INVENTION

1. Field of the Invention

The present invention relates to a method and an apparatus for controlling a four-wheel drive system of a motor vehicle, and more particularly to such method and apparatus for controlling clutch means such as a wet-type multiple-disk clutch for controlled distribution of an engine torque to front and rear drive wheels of the vehicle.

2. Discussion of the Prior Art

An example of a full-time 4-wheel drive system for a motor vehicle is proposed in U.S. Pat. No. 4,702,341, in which the output shaft of an automatic power transmission is connected to a carrier of a planetary-gear type center differential device. A ring gear which is one of two output members of the center differential device is connected to a rear wheel drive shaft, while a sun gear which is the other output member of the differential device is connected to a front wheel drive shaft via transmission means which consists of sprockets and a chain belt. A differential control clutch is disposed so as to connect two members of the planetary carrier, sun gear and ring gear, such that the torque transmitted through the differential control clutch may be changed.

While the differential control clutch is in the released or fully disengaged position, the center differential device can fully perform its differential operation. While the differential control clutch is in the fully engaged position, the center differential device is placed in the disabled state wherein the rear drive shaft and the front drive shaft of the vehicle are directly connected. While the differential control clutch is controlled for partial engagement between its fully disengaged and fully engaged positions, the distribution of the engine torque to the rear and front drive shafts may be suitable adjusted. The above-identified patent also discloses a control device which controls the differential control clutch to regulate the transmission torque of the clutch, according to the input torque, such that the transmission torque of the clutch increases with an increase in the throttle opening angle of the engine (increase in the operating amount of the accelerator pedal of the vehicle), so that the differential function of the center differential device is limited as the throttle opening angle is increased. This arrangement assures high drivability and driving stability of the vehicle where a relatively high output of the engine is required.

As described above, the differential control clutch is provided to limit the differential operation or function of the center differential device of the 4-wheel drive system. The differential control clutch is fully engaged and fully disengaged when needed, and the amount of engagement of the clutch is adjusted when needed. Alternatively, the amount of engagement of the differential control clutch is continuously controlled in order to continuously limit the differential function of the center differential device in a controlled fashion. In the latter case, the force of engagement of the clutch is predetermined so that the desired distribution ratio of the torque (bias ratio) between the front and rear wheels may be achieved due to a controlled slip amount of the clutch. Where an electronic control device is used to control the differential control clutch, the control device is adapted to release the differential control clutch once after the vehicle is started, in order to determine the differential ratio of the center differential device, so that the differential control clutch is inhibited from limiting the differential function of the center differential device when the determined differential ratio exceeds a predetermined reference value, due to an excessive amount of difference in the diameter of the front and rear wheels, which difference is caused by a burst of the tire or by snow chains installed on the tires.

In the former method wherein the engagement force of the differential control clutch is maintained at the predetermined value, the clutch is not fully disengaged or released during running of the vehicle. In the latter method wherein the clutch is fully disengaged only once during running of the vehicle, the clutch is not released again as long as the differential ratio of the center differential device determined by the electronic control device is maintained below the predetermined reference value.

In the above-described method of controlling the differential control clutch, the operation of the center differential device is always limited in a controlled degree by a controlled amount of engagement or slip of the clutch, so that the ratio of torque distribution to the front and rear wheels (bias ratio) is controlled to a predetermined optimum value. In this arrangement, the differential control clutch is fully disengaged only when the engine is stopped or when the differential ratio of the center differential device is detected. Accordingly, the differential control clutch is almost always held in a partially engaging condition, namely, in a slipping condition, as long as the vehicle is running in a steady state at a relatively high speed. Where a wet-type multiple-disk clutch is used as the differential control clutch, the friction surfaces of the clutch tend to be insufficiently supplied with a lubricant. The insufficient lubricant supply causes reduced life expectancy of the clutch due to wear, increased friction coefficient of the friction surfaces, abnormally elevated operating temperature of the clutch due to insufficient cooling by the lubricant, and early loss of the friction characteristics of the clutch.

SUMMARY OF THE INVENTION

It is therefore a first object of the present invention to provide a method of controlling a 4-wheel drive system of a motor vehicle, such that a differential operation or a torque distribution of the 4-wheel drive system is limited or controlled by a differential control clutch, in such a manner as to maintain high durability of the clutch, without influencing the running condition of the vehicle.

A second object of the invention is to provide an apparatus suitable for practicing the method of the invention.

The above first object may be achieved according to the principle of the present invention, which provides a method of controlling a 4-wheel drive system of a motor vehicle having a pair of front wheels and a pair of rear wheels and a power transmission, the 4-wheel drive system including clutch means having input and output elements which are rotatable relative to each other with a controlled amount of engagement therebetween, so as to control a ratio of distribution of a torque from the power transmission to front and rear wheels, the instant method comprising the steps of: determining whether the power transmission is commanded to be shifted from a first gear position to a second gear position whose speed ratio is different from that of the first gear position; and if the power transmission is commanded to be shifted to the second gear position, temporarily placing the clutch means in a fully disengaged position thereof for a predetermined time duration.

In the method of the present invention described above, the clutch means is released or fully disengaged when the second gear position is selected. Therefore, each time the second gear position is established, a suitable time is allowed. During this time, the clutch means may be lubricated where a wet-type multiple-disk friction clutch is used as the clutch means, for example. Where a viscous-fluid clutch employing a highly viscous fluid is used, a shearing stress to the viscous fluid is temporarily removed to thereby limit a temperature rise of the fluid while the clutch is in the fully disengaged position. Thus, the instant control method improves the durability or life expectancy of the clutch means, preventing early deterioration of the friction clutch due to wear, an increase in the friction coefficient of the friction surfaces of the clutch, and damages of the clutch due to heat.

Preferably, the step of determining whether the power transmission is commanded to be shifted consists of a step of determining whether the power transmission is commanded to be shifted up from the first position to the second position whose speed ratio is lower than that of the first position. In this case, the temporary disengagement of the clutch means does not impair the drivability or running stability of the vehicle, since the clutch means is disengaged when the transmission is shifted up to the high-speed gear position in which the drive torque of the wheels is relatively reduced. The disengagement of the clutch means upon shifting of the transmission to the high-speed gear position is further advantageous in that the input and output elements of the clutch means are rotated at a relatively high speed, which permits the clutch means to be sufficiently lubricated owning to the increased centrifugal force, where the clutch means is a wet-type multiple friction clutch. If the second gear position is the highest-speed gear position such as an overdrive gear position or fourth-speed gear position, the frequency at which the clutch means is fully disengaged may be optimized, since the shifting of the transmission to the highest-speed gear position will not take place so frequently.

The clutch means may be temporarily placed in the fully disengaged position immediately after a shifting action of the power transmission to establish the second gear position is completed. The determination as to whether the power transmission is commanded to be shifted to the second gear position may be made by determining whether there is generated a shift command to shift the power transmission to the second gear position. In this case, a predetermined time period after the generation of the shift command is measured, and the clutch means is brought to the fully disengaged position when the predetermined time period has elapsed after the generation of the shift command.

Usually, the power transmission has a plurality of forward-drive gear positions. The second gear position is preferably the highest-speed forward-drive gear position whose speed ratio is the lowest.

According to an advantageous form of the invention, the instant method further comprises: determining whether there is generated a shift command to shift the power transmission from the second gear position to the other gear position while the clutch means is in the fully disengaged position; and upon determination that the shift command is generated, immediately restoring the clutch means to an operable position thereof in which the amount of engagement between the input and output elements is controllable to control the ratio of distribution of the torque. In this case, the shifting of the transmission from the second gear position is effected while the torque is transmitted to all of the four drive wheels because of the clutch means immediately restored to its operable position. This arrangement prevents unstable running of the vehicle due to reduced drive forces of the four wheels, which may be encountered when one of the wheels slips on the road surface due to a change in the transmission torque upon shifting of the transmission from the second gear position.

According to another advantageous form of the invention, the method further comprises a step of determining whether a running condition of the vehicle is stabilized after the power transmission is shifted to the second gear position. In this case, the clutch means is brought to the fully disengaged position upon determination that the running condition of the vehicle is stabilized after the shifting of the transmission to the second gear position. In the present form of the invention, the temporary disengagement of the clutch means will not cause unstable running of the vehicle, since the clutch is disengaged only after the vehicle running condition is stabilized after the shifting of the transmission to the second gear position.

In the above form of the invention, the determination as to whether the vehicle running condition is stabilized or not may be effected by first detecting a running speed of the vehicle and an amount of operation of an accelerator pedal of the vehicle. The determination is then made based on the detected running speed and operating amount of the accelerator pedal. Alternatively, the determination may be made based on the detected amount of operation of the accelerator pedal in relation to the second gear position. A further alternative manner of determining the stabilized running condition of the vehicle consists of detecting an amount of change in the vehicle running speed and an amount of change in the operating amount of the accelerator pedal, and effecting the determination based on the detected amounts of change in the vehicle running speed and the operating amount of the accelerator pedal.

The second object described above may be accomplished according to another aspect of the present invention, which provides an apparatus for controlling a 4-wheel drive system of a motor vehicle having a pair of front wheels and a pair of rear wheels and a power transmission, the 4-wheel drive system including clutch means having input and output elements which are rotatable relative to each other through a controlled amount of engagement therebetween, so as to control a ratio of distribution of a torque from the power transmission to front and rear wheels, the apparatus comprising: determining means for determining whether the power transmission is commanded to be shifted from a first gear position to a second gear position whose speed ratio is different from that of the first gear position; and releasing means for temporarily placing the clutch means in a fully disengaged position thereof for a predetermined time duration, so that the torque is not transmitted between the input and output elements, if the determining means determines that the power transmission is commanded to be shifted to the second gear position.

According to one advantageous form of the apparatus of the invention, the second gear position has a speed ratio lower than that of the first gear position.

According to another advantageous form of the apparatus of the invention, another determining means is provided for determining whether there is generated a shift command to shift the power transmission from the second gear position after the power transmission is commanded to be shifted to the second gear position. Further, the apparatus includes restoring means operable upon determination by the above-indicated another determining means that the shift command is generated, for immediately restoring the clutch means to an operable position thereof in which the amount of engagement between the input and output elements is controllable to control the ratio of distribution of the torque.

According to a further advantageous form of the instant apparatus, another determining means is provided for determining whether a running condition of the vehicle is stabilized after the power transmission is shifted to the second gear position. In this case, the releasing means is adapted to bring the clutch means to the fully disengaged position when the above-indicated another determining means determines that the running condition of the vehicle is stabilized.

BRIEF DESCRIPTION OF THE DRAWINGS

The above and other objects, features and advantages of the present invention will become more apparent by reading the following detailed description of presently preferred embodiments of the invention, when considered in connection with the accompanying drawings, in which:

FIG. 4 is a timing chart indicating engaging and disengaging actions of the differential control clutch;

FIG. 5 is a schematic view showing another type of 4-wheel drive system which is controllable according to the present invention and FIGS. 6A, 6B and 6C are flow charts illustrating optional features that may be incorporated into the embodiment of FIG. 1.

DETAILED DESCRIPTION OF THE PREFERRED EMBODIMENT

Figure 1:
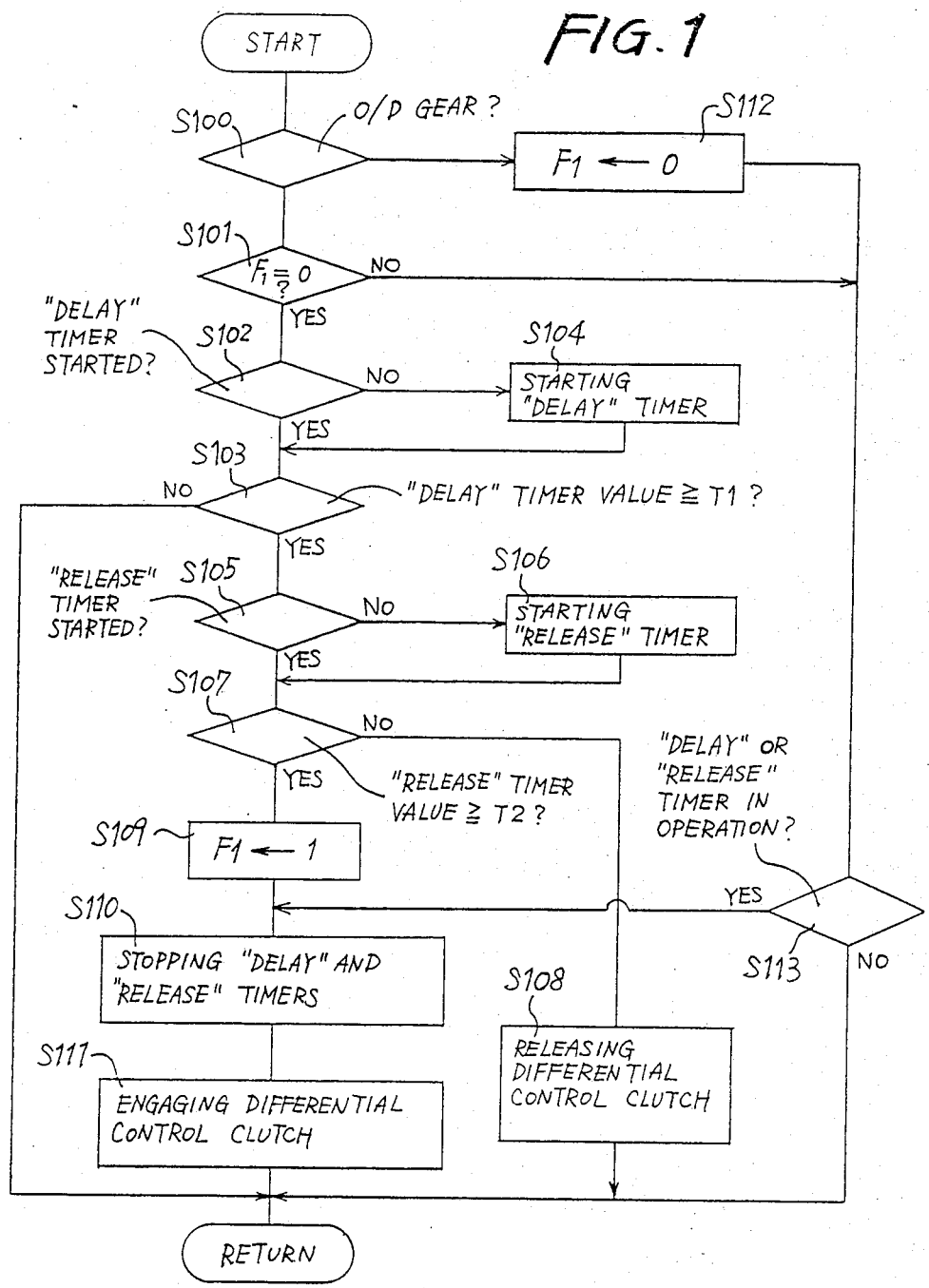
FIG. 1 is a flow chart illustrating one embodiment of a method of controlling a 4-wheel drive system of a motor vehicle, according to the present invention.
Figure 2:
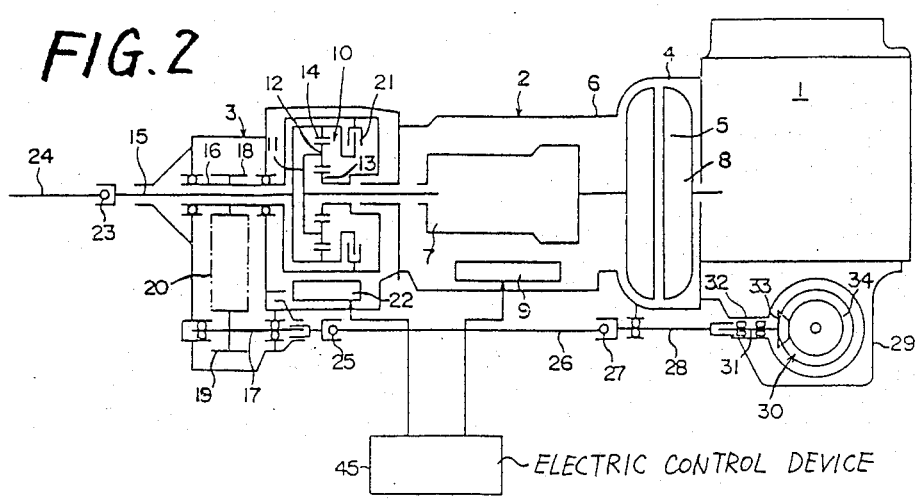
FIG. 2 is a schematic view of the 4-wheel drive system of the invention controlled by the method of FIG. 1.
Figure 3:
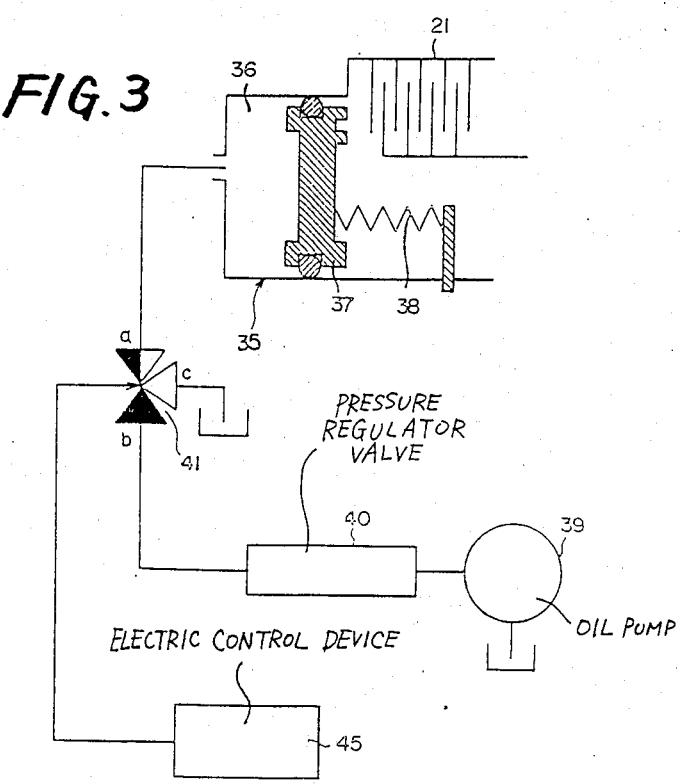
FIG. 3 is a schematic view showing a control arrangement of a differential control clutch used in the 4-wheel drive system of FIG. 2.

The control method according to one embodiment of the present invention illustrated in FIG. 1 may be practiced on the 4-wheel drive system of a motor vehicle as shown in FIGS. 2 and 3, by way of example. The 4-wheel drive system includes an automatic power transmission and a 4-wheel drive transfer device, which are electronically controlled as described below. In FIG. 2, numeral 1 denotes an internal combustion engine which is installed on a front section of the motor vehicle such that the crankshaft of the engine 1 is parallel to the running or longitudinal direction of the vehicle. To the engine 1, there are connected the automatic power transmission 2 and the 4-wheel drive transfer device 3, which are disposed in this order in the rearward direction opposite to the running direction of the vehicle. The power transmission 2 includes a common fluid type torque converter 5 housed in a converter casing 4, and a gear-type automatic transmission unit 7 housed in a transmission casing 6. The output shaft in the form of the crankshaft of the engine 1 is coupled with an input member 8 of the torque converter 5, whereby a torque of the engine 1 is transmitted to the transmission unit 7 via the torque converter 5. The transmission unit 7 is a planetary gear transmission of a type which is widely used for an automotive vehicle. The planetary gear transmission unit 7 has a plurality of forward-drive gear positions, which are selectively established by means of a hydraulic control device 9. The forward-drive gear positions include an overdrive gear position, which is the highest-speed, forward-drive position whose speed ratio is the lowest of all the speed ratios of the forward-drive positions.

The 4-wheel drive transfer device 3 has a center differential device 10 of a planetary gear type, which is adapted for a full-time four-wheel driving of the vehicle (as distinguished from a part-time four-wheel driving) wherein the power of the engine 1 is always transmitted to all of the four wheels of the vehicle. The center differential device 10 includes a carrier 11 which serves as an input member receiving the torque from the transmission unit 7. The center differential device 10 further includes a planetary pinion 12 supported by the carrier 11, and a sun gear 13 and a ring gear 14 which mesh with the planetary pinion 12. The ring gear 14 is connected to a rear drive shaft 15, while the sun gear 13 is connected to a tubular front drive intermediate shaft 16 which is coaxial with the rear drive shaft 15. The 4-wheel drive transfer device 3 is provided with a front drive intermediate shaft 16. The shafts 16 and 17 are connected to each other by an endless chain belt 20 such that the chain belt 20 engages sprockets 18, 19 fixed to the shafts 16, 17.

The 4-wheel transfer device 3 incorporates a hydraulically operated differential control clutch 21 for connecting the sun gear 13 and the ring gear 14, as needed. The differential control clutch 21 is controlled by a hydraulic control device 22 provided on the 4-wheel drive transfer device 3.

The differential control clutch 21 is a wet-type multiple-disc clutch having input and output elements such as clutch disks and plates that are controlled by a hydraulic servo system, as shown in FIG. 3. Described more specifically, the clutch 21 includes a hydraulic servo device 35 having a fluid chamber 36 in which a servo piston 37 is accommodated. When the servo piston 37 is moved to the right (as seen in FIG. 3) against a biasing action of a return spring 38, by a hydraulic pressure applied to the fluid chamber 36, the sun gear 13 and the ring gear 14 of the center differential device 10 are connected, such that the torque transmitted through the clutch 21 proportionally increases with the hydraulic pressure in the fluid chamber 36.

The hydraulic control device 22 includes a pressure regulator valve 40 adapted to regulate a pressure produced by an oil pump 39 built in the automatic transmission 2. The control device 22 further includes a solenoid-operated servo control valve 41 which receives the fluid pressure regulated by the pressure regulator valve 40. The servo control valve 41 has a port "a" connected to the fluid chamber 36 of the hydraulic servo device 35, a port "b" which receives the pressure from the pressure regulator valve 40, and a drain port "c" which communicates with a reservoir. When the valve 41 is in the energized state, the ports "a" and "b" are held in communication with each other. When the valve 41 is in the deenergized state of the valve 41, the port "a" is held in communication with the drain port "c". The servo control valve 41 is adapted to receive from an electronic control device 45 a pulse signal indicative of a duty cycle of the valve 41, so that the pressure applied to the fluid chamber 36 from the servo control valve 41 corresponds to the duty cycle controlled by the pulse signal from the control device 45. The rear drive shaft 15 is connected through a universal coupling 23 to one end of a rear propeller shaft 24, while the front drive shaft 17 is connected through a universal coupling 23 to one end of a rear propeller shaft 26, which extends substantially parallel to the axis of the automatic power transmission 2. The other end of the front propeller shaft 26 is connected, through a universal coupling 27 and an intermediate coupling shaft 28, to one end of an input shaft or drive pinion shaft 31 of a front differential device 30. The drive pinion shaft 31 is rotatably supported by a differential casing 32 which is formed integrally with a cast iron oil pan 29 of the internal combustion engine 1.

The drive pinion shaft 31 is provided with a drive pinion 33 in the form of a bevel gear 33 attached to its end. The drive pinion 33 is held in mesh with a ring gear 34 of the front differential device 30.

The hydraulic control devices 9 and 22 are operated in response to control signals from the electronic control device 45, so as to place the transmission unit 7 selectively in the appropriate one of the gear positions, and to control the engaging and disengaging actions of the differential control clutch 21 such that the transmission torque is suitably controlled while the clutch is partially engaged. The electronic control device 45 includes a so-called microcomputer, which incorporates counters serving as timers. The control device 45 receives various input signals that are indicative of a running speed detected by a vehicle speed sensor 80, a steering angle detected by a steering angle sensor 82, a throttle opening angle detected by a throttle sensor 84, a shift lever position detected by a shift position sensor 86, front wheel speeds detected by a front wheel speed sensor 88, rear wheel speeds detected by a rear wheel speed sensor 90, a brake pedal position detected by a brake sensor 92, and other parameters of the motor vehicle. The vehicle speed may be determined based on signal or signals generated by a sensor provided for detecting the rotating speed of the rear drive shaft 15 or front drive shaft 17, and/or a sensor for detecting the rotating speed of the front drive intermediate shaft 16. The accuracy of measurement of the vehicle speed may be improved if the control device 45 uses the signals from all of these speed sensors.

Basically, the electronic control device 45 applies to the hydraulic control device 9 the command signals for shifting the transmission unit 7 according to shift patterns which are predetermined based on the currently selected position of the shift lever, and the current vehicle running speed and throttle opening angle. Further, the control device 45 applies the duty cycle pulse signal to the servo control valve 41 of the hydraulic control device 22, so as to control the transmission torque of the differential control clutch 21, normally based on the selected position of the transmission unit 7 and the throttle opening angle. The servo control valve 41 is operated also based on the signals indicative of the angle of rotation of the steering wheel and the amount of slip of the wheels, so that the servo control valve 41 is deenergized to discharge the fluid from the fluid chamber 36, for fully disengaging the differential control clutch 21, when the particular running conditions of the vehicle are met.

Generally, the 4-wheel drive system including the automatic power transmission 2 and the 4-wheel drive transfer device 3 is controlled in the manner as described below be reference to the flow chart of FIG. 1. Initially, the control flow goes to step S100 in which the control device 45 determines whether the overdrive gear position (hereinafter referred to as "O/D gear position") is currently selected based on the vehicle speed and throttle opening angle, or not. This determination may be effected by determining whether an O/D gear shift command for selecting the O/D gear position is present or not, or whether the servo pressure for establishing the O/D gear position starts to be raised, or not. If an affirmative decision (YES) is obtained in step S100, the control flow goes to step S101 to determine whether a flag F1 is in the reset state ("0"), or not. As is understood from the following description, this flag F1 is provided to release or disengage the differential control clutch 21 only once when the O/D gear position is selected. When the flag F1 is "0" (in the reset state), this means that the clutch 21 has not been disengaged after the O/D gear position is commanded. In this case (i.e., if an affirmative decision (YES) is obtained in step S101), step S101 is followed by step S102 wherein the control device 45 determines whether a DELAY time has been started. If the DELAY timer is in operation, that is, if an affirmative decision (YES) is obtained in step S102, the control flow goes to step S103 to determine whether the content of the DELAY time exceeds a predetermined waiting time T1. If the DELAY timer has not been started, or a negative decision (NO) is obtained in step S102, step S104 is executed to turn on or start the DELAY time, and then step S103 is executed. The predetermined waiting time T1 is determined so as to allow a sufficient time for the O/D clutch servo pressure and output shaft torque of the transmission unit 7 to be stabilized. If the content or count of the DELAY timer exceeds this predetermined time T1, or if an affirmative decision (YES) is obtained in step S103, this indicates that the clutch 21 may be released or fully disengaged. In this case, therefore, the control flow goes to step S105 to determine whether a RELEASE timer for measuring a predetermined time duration T2 for which the clutch 21 is fully disengaged or released has been started or not. If this RELEASE timer is not in operation, the control flow goes to step S106 to start the RELEASE time, and then to step S107. If the RELEASE timer is in operation, step S105 is immediately followed by step S107, in which the control device 45 determines whether the content of the RELEASE timer exceeds the predetermined time duration T2.

If the content of the RELEASE time is equal to or shorter than the predetermined time duration T2, or if a negative decision (NO) is obtained in step S107, the control flow goes to step S108 in which the differential control clutch 21 is fully disengaged or released, or kept in the fully disengaged position. Described in greater detail, the solenoid-operated servo control valve 41 is deenergized for communication of the port "a" with the drain port "c", to thereby permit the fluid in the chamber 36 of the hydraulic servo device 35 to be discharged, whereby the differential control clutch 21 is brought to the fully disengaged position. Then, the control flow returns to step S100. If the content of the RELEASE timer exceeds the predetermined value T2, or is an affirmative decision (YES) is obtained in step S107, the control flow goes to step S109 to set the flag F1 to "1", whereby the clutch 21 is thereafter inhibited from being fully disengaged. Then, the control flow goes to step S110 to stop the RELEASE time and the DELAY time, and then to step S111 to engage the differential control clutch 21, for effecting an ordinary differential control operation of the center differential device 10. Namely, the electronic control device 45 calculates the duty cycle of the solenoid-operated servo control valve 41, based on the various input signals indicated above, and applies to the valve 41 the duty cycle pulse signal indicative of the calculated duty cycle, whereby the input and output elements of the clutch 2 may be rotated relative to each other to the extent corresponding to the controlled duty cycle of the servo control valve 41. For example, the duty cycle is determined so that the amount of engagement of the clutch 21 (degree of limiting of the operation of the center differential device 10) increases with the required drive torque of the wheels, which is represented by the operating amount of the accelerator pedal.

If a negative decision (NO) is obtained in step S100, the control flow goes to step S112 to reset the flag F1 to "0", and then to step S113 to determine whether the RELEASE timer or DELAY time is in operation, or not. An affirmative decision (YES) in step S113 indicates that the transmission unit 7 has been commanded to be shifted from the O/D gear position to a lower gear position while the differential control clutch 21 is fully disengaged or released. In this case, the RELEASE time is stopped in step S110, and the clutch 21 is immediately fully engaged in step S111. If the RELEASE timer or DELAY timer is not in operation (if a negative decision is obtained in step S113), this indicates that the differential control clutch 21 is not fully disengaged, i.e., is in an engaged state to effect the ordinary differential control operation. In this case, the control flow returns to step S100.

If a negative decision (NO) is obtained in step S101 with the flag F1 set to "1", this indicates that the differential control clutch 21 has been released, whereby step S113 is immediately executed.

If a negative decision (NO) is obtained in step S103, this indicates that the waiting time T1 has not elapsed after the transmission unit 7 has been commanded to select the O/D gear position, that is, the O/D clutch pressure and output shaft torque of the transmission unit 7 have not been stabilized. In this case, the control flow goes back to step S100. Thus, step S103 is repeatedly executed to measure the waiting time T1 after the O/D gear position has been commanded.

Referring to the timing chart of FIG. 4, the operation to disengage the differential control clutch 21 for the predetermined time duration T2 will be described in detail. Upon generation of the command signal to establish the O/D gear position of the transmission unit 7, the DELAY timer is started when the O/D clutch servo pressure is raised to a predetermined level. As the O/D clutch servo pressure is raised, the O/D clutch is gradually engaged and the output shaft torque of the transmission unit 7 is changed. When the O/D clutch servo pressure reaches a certain high level, the output shaft torque of the transmission unit 7 is stabilized with the O/D clutch sufficiently engaged. That is, the waiting time T1 from the moment of generation of the O/D gear position command and the moment of initiation of disengagement of the differential control clutch 21 is determined so as to permit the O/D clutch of the transmission unit 7 to be substantially engaged, or permit the unit 7 to be placed in the O/D gear position. When the time T1 has elapsed, the pressure in the fluid chamber 36 of the servo device 35 for the differential control clutch 21 is discharged, whereby the clutch 21 is fully disengaged. At the same time, the RELEASE time is started to measure the time duration T2 for which the clutch 21 is held in its fully disengaged position. When the time duration T2 has elapsed, the pressure is applied to the fluid chamber 36, to engage the differential control clutch 21, in order to effect the differential control operation of the center differential device 10, such that the amount of engagement of the clutch 21 is suitably controlled by the electronic control device 45, as described above.

In the differential control method described above, the differential control clutch 21 is temporarily released or fully disengaged during running of the vehicle with transmission unit 7 placed in the O/D gear position. Consequently, the friction surfaces of the clutch 21 are supplied with a lubricant oil. Since the O/D gear position permits the clutch 21 to be rotated at a comparatively high speed, the lubricant may be sufficiently supplied to the clutch 21 due to a comparatively large centrifugal force. Further, the clutch 21 is not excessively lubricated, since the O/D gear position is not so frequently selected as the other gear positions of the transmission unit 7. It is also noted that the differential control clutch 21 is released while the transmission unit 7 is shifted up to the O/D gear position. In other words, the clutch 21 is disengaged while the output shaft torque of the unit 7 is reduced. This means that the disengagement of the clutch 21 will not impair the running stability of the vehicle. In addition, the waiting time T1 measured by the DELAY time permits the clutch 21 to be disengaged only after the shifting of the transmission unit 7 to the O/D gear position is almost completed. Consequently, the disengagement of the clutch 21 will not cause a sudden change in the drive force of a drive wheel of the vehicle, which may cause the drive wheel to slip on the road surface, resulting in decreasing the drive forces of all the four wheels. The instant control method is further advantageous in that the differential control clutch 21 is engaged immediately after the transmission unit 7 is commanded to be shifted from the O/D gear position to the other gear positions (lower gear positions) during the time duration T2 after the clutch 21 is commanded to be disengaged. In this case, the amount of engagement of the clutch 21 is suitably controlled to effect the ordinary differential control operation of the front and rear wheels of the center differential device 10, such that the drive torque of the engine 1 is suitably distributed to the four wheels. Thus, the instant control arrangement assures a high degree of running stability of the vehicle during shifting of the unit 7 from the O/D gear position to the other gear position.

It is noted that the temporary disengagement of the differential control clutch 21 tends to reduce the running stability of the vehicle. Therefore, it is desirable to disengage the clutch 21 while the vehicle is running in a stable or steady state. In view of this requirement, the clutch 21 of the illustrated embodiment is disengaged only after the predetermined waiting time T1 has elapsed. However, it is preferred that the electronic control device 45 be adapted to monitor the various input signals indicative of the running conditions of the vehicle, in order to determine whether the disengagement of the clutch 21 is permitted or not.

Described more particularly, the control device 45 determines whether the running condition of the vehicle is stabilized after the generation of a command to select the O/D gear position of the transmission unit 7, and then commands the differential control clutch 21 to be fully disengaged when the control device determines that the vehicle running condition has been stabilized. The stabilized running condition or state means the absence of change or variation in a selected parameter or parameters, which exceeds a predetermined upper limit. For instance, the drive force (operating amount of the accelerator pedal, or throttle opening angle) of the wheels, and/or vehicle speed, and/or vehicle running direction (steering angle) may be used as the parameter on which the determination on the steady running state is accomplished. In one example shown in the flow chart of FIG. 6A, the control device 45 determines in step S202 that the vehicle is in a stabilized or steady running state, where the vehicle speed detected by the vehicle speed sensor 80 is higher than a predetermined limit aKm/h (step S200) while the operating amount of the accelerator pedal (throttle opening angle detected by the throttle sensor 84) is smaller than a predetermined lower limit. If a negative decision (NO) is obtained in either of the steps S200 and S201, the clutch 21 is not released even if the time T1 has elapsed. In step S202, the clutch 21 is released for the time duration T2. It is also noted that it is comparatively difficult to establish the steady running state when the transmission unit 7 is shifted to a low gear position, since the shifting between low gear positions (e.g., 1st and 2nd gear positions) frequently takes place. In this respect, the currently selected gear position of the transmission unit 7 detected by the shift position sensor 86 may be used as one of the parameters for effecting the determination of the steady running condition or state. In one example shown in FIG. 6B, the control device 45 may be adapted to determine, in step S302, the presence of the steady running state if the operating amount of the accelerator pedal (throttle opening angle) is smaller than the predetermined limit 01% (step S301) while the transmission unit 7 is placed in a certain gear position or a gear position (e.g. 011) gear position higher than that certain gear position (step S300). If a negative decision (NO) is obtained in either of steps S300 and S301 the clutch is not released. In step S302, the clutch is released for the time duration T2. Further, the steady running state means comparatively reduced changes in the vehicle running speed and the drive force of the wheels (which is determined by the operating amount of the accelerator pedal, i.e., throttle opening angle). Therefore, the presence of the steady running state may be determined by comparing the amounts of changes in the running speed and operating amount of the accelerator pedal, with the respective upper limits a and θ1, as indicated in steps S400, S401 and S402 shown in the flow chart of FIG. 6C. If a negative decision (NO) is obtained in either of the steps S400 and S401, the clutch 21 is not released. In step S402, the clutch 21 is released for the time duration T2.

In the illustrated embodiment, the pressure in the fluid chamber 36 of the hydraulic control device 22 is suitably adjusted by the electronic control device 45, so as to control the amount of engagement of the differential control clutch 21, and thereby control the distribution of the torque of the engine 1 to the front and rear wheels. However, a constant hydraulic pressure may be applied to the servo device for the differential control clutch 21, via a solenoid-operated control valve, so that a suitable amount of slip between the input and output elements of the clutch 21 is permitted so as to maintain a constant distribution of the engine torque to the front and rear wheels. In this case, a pressure switch is provided in a fluid passage leading to the O/D clutch servo device, to detect the pressure in the O/D clutch servo device. The DELAY timer is started in response to a signal from the pressure switch. When the waiting time T1 has been measured by the DELAY timer, the solenoid-operated control valve indicated above is activated to permit the fluid to be discharged from the servo device for the clutch 21, whereby the clutch 21 is fully disengaged. At the same time, the RELEASE timer is started to measure the time duration T2 during which the clutch 21 is held disengaged. After the time duration T2, the solenoid-operated control valve is operated to apply the predetermined constant pressure to the servo device for the clutch 21.

While the illustrated embodiment is adapted to temporarily release or disengage the differential control clutch 21 when the transmission unit 7 is shifted up to the O/D gear position (highest gear position), it is possible that the clutch 21 is released when the transmission unit 7 is shifted up from a comparatively low gear position to a higher gear position, for example, from the 1st gear position to the second gear position.

While the 4-wheel drive system shown in FIG. 2 is adapted to a front-engine, rear-drive vehicle (FR vehicle), the principle of the invention is equally applicable to a front-engine, front-drive vehicle (FF vehicle). An example of the rear-wheel drive system for such an FF vehicle is illustrated in FIG. 5, wherein reference numeral 50 designates an internal combustion engine which is installed in a front section of the vehicle, transversely of the vehicle such that the crankshaft is perpendicular to the vehicle running direction. The engine 50 is connected to an automatic power transmission 51 and a 4-wheel drive transfer device 52, in this order. The automatic power transmission 51 includes a fluid-type torque converter 53 having a commonly known construction, and a transmission unit 54.

The torque converter 53 is connected at its input member 53a to an output shaft 55 of the engine 50, while its output member 53b is connected to the transmission unit 54.

The transmission unit 54 is a planetary gear transmission constructed as generally known in the art, and has a plurality of forward drive gear positions and at least one reverse gear position.

The transmission unit 54 is shifted hydraulically by means of a hydraulic control device 56.

The 4-wheel drive transfer device 52 includes a center differential device 57, which has a differential casing 60 with an integrally formed input gear 59 that meshes with an output gear 58 of the transmission unit 54. The center differential device 57 further has a pair of opposed differential pinions 62 which are rotatably supported by pinion shaft 61 provided on the differential casing 60. The differential pinions 62 mesh with a rear drive side gear 63 and a front drive side gear 64, respectively.

To the rear drive side gear 63, there is connected a gear 65, which in turn meshes with a rear drive gear 67 fixed to a rear drive shaft 66. To the front drive side gear 64, there is directly connected a tubular front drive shaft 68.

The 4-wheel drive transfer device 52 incorporates a hydraulically operated differential control clutch 69 which connects the differential casing 60 (input member of the center differential device 57) and the front drive shaft 68 (one of output members of the center differential device 57), as needed. The differential control clutch 69 is a wet-type multiple-disc clutch controlled by a hydraulic servo device, such that the torque transmitted through the clutch 69 proportionally increases with the hydraulic pressure applied to the servo device.

The controlled hydraulic pressure is supplied to the servo device for the differential control clutch 69, from a hydraulic control device 70 which is operated in response a duty cycle pulse signal received from an electronic control device 71, so that the pressure applied to the servo device is determined by the pulse signal.

The front drive shaft 68 is connected to a differential casing 73 of a front differential device 72. The differential device 72 includes two opposed differential pinions 75 rotatably supported by pinion shafts 74 provided on the differential casing 73, and a right side gear 76 and a left side gear 77 which mesh with the differential pinions 75, respectively. The right side gear 76 is connected to one end of a right axle 78, while the left side gear 77 is connected to one end of a left axle 79.

The hydraulic control devices 56, 70 are operated according to control signals from the electronic control device 71. Like the control device 45 used in the preceding embodiment, the control device 71 is operated based on various input signals indicative of the vehicle running speed, steering angle, throttle opening angle, transmission shift lever, front wheel speeds, rear wheel speeds, a brake pedal position, and other parameters of the motor vehicle.

The electronic control device 71 applies to the hydraulic control device 56 the control signals for shifting the transmission unit 54 according to shift patterns which are predetermined based on the currently selected position of the shift lever, and the current vehicle running speed and throttle opening angle. Further, the control device 71 applies the duty cycle pulse signal to the servo control valve of the hydraulic control device 56, so as to control the transmission torque of the differential control clutch 69, normally based on the selected position of the transmission unit 54 and the throttle opening angle. The servo control valve is operated also based on the signals indicative of the angle of rotation of the steering wheel and the amount of slip of the wheels, so that the servo control valve is deenergized for fully disengaging the differential control clutch 69, when the particular running conditions of the vehicle are met. It will be understood that the control routine illustrated in FIG. 1 is applicable to the 4-wheel drive system of FIG. 5.

While the 4-wheel drive systems illustrated in FIGS. 2 and 5 employ the center differential device 10, 57 and are adapted to a full-time 4-wheel drive vehicle wherein the engine torque is always transmitted to the four drive wheel, the control method and apparatus according to the principle of the present invention is applicable to a part-time 4-wheel drive vehicle wherein suitable clutch means such as a wet-type multiple-disk clutch is used to selectively establish two different modes, i.e., a two-wheel drive mode and a four-wheel drive mode. In this case, the clutch means for selecting the operation modes is controlled according to the principle of the invention. The clutch means controlled according to the present invention is not limited to the friction clutch, but may be other types of clutches such as a viscous clutch using a viscous fluid such as a silicone oil, or an electromagnetic clutch. Where the viscous clutch is used for effecting a differential control operation of the center differential device, suitable means is provided to place the viscous clutch in a non-operated or fully disengaged position when the transmission unit is shifted up to a comparatively high gear position. This arrangement is effective to reduce an increase in the operating temperature of the viscous clutch due to continuous application of a shearing stress to the viscous fluid, whereby the durability of the clutch is improved. Where the electromagnetic clutch is used, the coil of the clutch is deenergized to release the clutch when the transmission unit is shifted up.

While the present invention has been described in its presently preferred embodiments, it is to be understood that the invention is not limited to the details of the illustrated embodiments and the modifications indicated above, but the invention may be embodied with various other changes, modifications and improvements, which may occur to those skilled in the art, without departing from the spirit and scope of the invention defined in the following claims.

What is claimed is:

1. A method of controlling a 4-wheel drive system of a motor vehicle having a pair of front wheels and a pair of rear wheels and a power transmission, the 4-wheel drive system including clutch means having input and output elements which are rotatable relative to each other with a controlled amount of engagement therebetween, so as to control a ratio of distribution of a torque from the power transmission to front and rear wheels, said method comprising the steps of:

determining whether said power transmission is commanded to be shifted from a first gear position to a second gear position whose speed ratio is different from that of said first gear position; and if said power transmission is commanded to be shifted to said second gear position, temporarily placing said clutch means in a fully disengaged position thereof for a predetermined time duration to thereby improve durability of said clutch means.

2. A method according to claim 1, wherein said second gear position has a speed ratio which is lower than that of said first gear position.

3. A method according to claim 1, wherein said clutch means is temporarily placed in said fully disengaged position immediately after a shifting action of said power transmission to establish said second gear position is completed.

4. A method according to claim 1, wherein said step of determining whether said power transmission is commanded to be shifted to said second gear position comprises determining whether there is generated a shift command to shift said power transmission to said second gear position, said method further comprising a step of measuring a predetermined time period after the generation of said shift command, said step of temporarily placing said clutch means in said fully disengaged position being initiated when said predetermined time period has elapsed after the generation of said shift command.

5. A method according to claim 2, wherein said power transmission has a plurality of forward-drive gear positions, and said second gear position is one of said forward-drive gear positions whose speed ratio is the lowest.

6. A method according to claim 1, further comprising the steps of:
determining whether there is generated a shift command to shift said power transmission from said second gear position while said clutch means is placed in said fully disengaged position; and
upon determination that said shift command is generated, immediately restoring said clutch means to an operable position thereof in which the amount of engagement between said input and output elements is controllable to control said ratio of distribution of said torque.

7. A method according to claim 1, further comprising a step of determining whether a running condition of said vehicle is stabilized after said power transmission is shifted to said second gear position, said clutch means is brought to said fully disengaged position upon determination that said running condition of the vehicle is stabilized.

8. A method according to claim 7, wherein said step of determining whether a running condition of said vehicle is stabilized comprises detecting a running speed of the vehicle and an amount of operation of an accelerator pedal of the vehicle, and effecting the determination on said running condition, based on the detected running speed and amount of operation of the accelerator pedal.

9. A method according to claim 7, wherein said step of determining whether a running condition of said vehicle is stabilized comprises detecting an amount of operation of an accelerator pedal of the vehicle, and effecting the determination on said running condition, based on said second gear position and the detected operating amount of the accelerator pedal.

10. A method according to claim 7, wherein said step of determining whether a running condition of said vehicle is stabilized comprises detecting an amount of change in a running speed of the vehicle and an amount of change in an operating amount of an accelerator pedal of the vehicle, and effecting the determination on said running condition, based on the detected amounts of change in said running speed of the vehicle and said operating amount of said accelerator pedal.

11. An apparatus for controlling a 4-wheel drive system of a motor vehicle having a pair of front wheels and a pair of rear wheels and a power transmission, the 4-wheel drive system including clutch means having input and output elements which are rotatable relative to each other with a controlled amount of engagement therebetween, so as to control a ratio of distribution of a torque from the power transmission to front and rear wheels, said apparatus comprising:
determining means for determining whether said power transmission is commanded to be shifted from a first gear position to a second gear position whose speed ratio is different from that of said first gear position; and
releasing means for temporarily placing said clutch means in a fully disengaged position thereof for a predetermined time duration, if said determining means determines that said power transmission is commanded to be shifted to said second gear position to thereby improve durability of said clutch means.

12. An apparatus according to claim 11, wherein said second gear position has a speed ratio which is lower than that of said first gear position.

13. An apparatus according to claim 11, wherein said determining means further determines whether there is generated a shift command to shift said power transmission from said second gear position after said power transmission is commanded to be shifted to said second gear position, and restoring means operable upon determination by said determining means that said shift command is generated, for immediately restoring said clutch means to an operable position thereof in which the amount of engagement between said input and output elements is controllable to control said ratio of distribution of said torque.

14. An apparatus according to claim 11, wherein said determining means further determines whether a running condition of said vehicle is stabilized after said power transmission is shifted to said second gear position, said releasing means bringing said clutch means to said fully disengaged position, when said determining means determines that the running condition of the vehicle is stabilized.

* * * * *